(12) United States Patent
Sode et al.

(10) Patent No.: US 9,287,539 B2
(45) Date of Patent: Mar. 15, 2016

(54) MANUFACTURING METHOD FOR BATTERY CASE LID INCLUDING EXPLOSION-PROOF VALVE

(75) Inventors: Takayuki Sode, Okaya (JP); Yukinori Sugiyama, Okaya (JP); Shinichi Nomura, Tokyo (JP); Masato Kobayashi, Niigata (JP)

(73) Assignees: SOODE NAGANO CO., LTD., Nagano (JP); NIPPON LIGHT METAL COMPANY LTD., Tokyo (JP)

( * ) Notice: Subject to any disclaimer, the term of this patent is extended or adjusted under 35 U.S.C. 154(b) by 305 days.

(21) Appl. No.: 13/879,363

(22) PCT Filed: Aug. 22, 2011

(86) PCT No.: PCT/JP2011/068827
§ 371 (c)(1),
(2), (4) Date: Apr. 12, 2013

(87) PCT Pub. No.: WO2012/049907
PCT Pub. Date: Apr. 19, 2012

(65) Prior Publication Data
US 2013/0196188 A1 Aug. 1, 2013

(30) Foreign Application Priority Data

Oct. 13, 2010 (JP) .................................. 2010-230226
Oct. 26, 2010 (JP) .................................. 2010-239444

(51) Int. Cl.
| | |
|---|---|
| *H01M 2/12* | (2006.01) |
| *B21C 23/18* | (2006.01) |
| *B21D 11/08* | (2006.01) |
| *B21D 51/44* | (2006.01) |
| *B21K 23/00* | (2006.01) |

(Continued)

(52) U.S. Cl.
CPC ............ *H01M 2/1241* (2013.01); *B21C 23/186* (2013.01); *B21D 11/08* (2013.01); *B21D 51/383* (2013.01); *B21D 51/44* (2013.01); *B21K 23/00* (2013.01); *H01M 2/0426* (2013.01)

(58) Field of Classification Search
CPC ... H01M 2/04; H01M 2/0408; H01M 2/0413; H01M 2/0456; H01M 2/0426; H01M 2/1235; H01M 2/1241
See application file for complete search history.

(56) References Cited

U.S. PATENT DOCUMENTS

2008/0118823 A1   5/2008   Yang et al.

FOREIGN PATENT DOCUMENTS

| EP | 0 955 111 | 11/1999 | |
|---|---|---|---|
| EP | 955111 | * 11/1999 | ............. B21K 23/04 |

(Continued)

OTHER PUBLICATIONS

Japanese Office Action for corresponding Japanese Application No. 2011-206190 mailed Apr. 8, 2014 (4 pages).

(Continued)

*Primary Examiner* — Raymond Alejandro
(74) *Attorney, Agent, or Firm* — Merchant & Gould P.C.

(57) ABSTRACT

Provided is a battery case lid (1) formed by working a metal plate, including: a substrate section (2) and an explosion-proof valve (4) formed in the substrate section (2), wherein the explosion-proof valve (4) has a reduced thickness section (41) thinner than the substrate section (2), and the reduced thickness section (41) is formed by extending the metal plate by applying pressure while the metal plate is kept unrestrained.

4 Claims, 14 Drawing Sheets

(51) Int. Cl.
*B21D 51/38* (2006.01)
*H01M 2/04* (2006.01)

(56) References Cited

FOREIGN PATENT DOCUMENTS

| | | |
|---|---|---|
| JP | 09-316580 | 12/1997 |
| JP | 10-029031 | 2/1998 |
| JP | 10-156481 | 6/1998 |
| JP | 2866356 | 3/1999 |
| JP | 11-204093 | 7/1999 |
| JP | H11273640 | 10/1999 |
| JP | 2001-137961 | 5/2001 |
| JP | 2011-137961 | 5/2001 |
| JP | 3222418 | 8/2001 |
| JP | 2004-178820 | 6/2004 |
| JP | 2006-272458 | 10/2006 |
| JP | 2006-351234 | 12/2006 |
| JP | 2007-179793 | 7/2007 |
| JP | 2009-289637 | 12/2009 |
| JP | 2011-154957 | 8/2011 |
| JP | 2012-104473 | 5/2012 |
| TW | 486156 | 7/2000 |
| TW | 424342 | 3/2001 |
| TW | 428339 | 4/2001 |
| TW | M311123 | 5/2007 |
| TW | M352781 | 3/2009 |
| WO | WO 2010/116504 | 10/2010 |

OTHER PUBLICATIONS

Machida et al. "Plastic working: very basics." *Nikkan Kogyo Shimbun, Ltd. First Edition*. Feb. 25, 2008. pp. 88-93 (partial translation provided).
Taiwanese Office Action for corresponding Taiwan Application mailed Jul. 14, 2014 (8 pages).
European Search Report for corresponding application No. 11832349.2 dated Feb. 26, 2014 (8 pages).
Japanese Office Action for corresponding application No. 2011-206190 dated Dec. 13, 2013 (7 pages).
Japanese Office Action for corresponding application No. 2011-206191 dated Dec. 13, 2013 (4 pages).
International Search Report for International Application No. PCT/JP2011/068827 mailed Nov. 1, 2011 (8 pages).
Korean Action for KR Application No. 10-2013-7011724 dated Sep. 30, 2014, partial translation provided (9 pages).

* cited by examiner

Internal Pressure

MANUFACTURING METHOD FOR BATTERY CASE LID INCLUDING EXPLOSION-PROOF VALVE

TECHNICAL FIELD

This application is a National Stage Application of PCT/JP2011/068827, filed 22 Aug. 2011, which claims benefit of Serial No. 2010-230226, filed 13 Oct. 2010 in Japan and Serial No. 2010-239444, filed 26 Oct. 2010 in Japan, and which application(s) are incorporated herein by reference. To the extent appropriate, a claim of priority is made to each of the above disclosed applications.

The present invention relates to a battery case lid for use in a secondary battery.

BACKGROUND ART

Secondary batteries comprise, for example, a battery case containing an electrolyte and a battery case lid closing an opening of the battery case. The battery case lid mainly includes a substrate section welded to the battery case and an explosion-proof valve for releasing the internal pressure from inside the battery case when abnormality occurs to the electrolyte. The explosion-proof valve is thinned compared to the substrate section and designed to rupture when the internal pressure exceeds a predetermined value.

Conventionally, in a case where the explosion-proof valve is formed, the explosion-proof valve is joined to the substrate section by, for example, welding. When the explosion-proof valve is joined to the substrate section by welding, however, it is difficult to make the thickness of the joining portion uniform. This gives rise to a problem that an operational pressure at which the internal pressure is released cannot be made constant. In addition, there is another problem that the welding involves complicated joining operation.

Patent document 1 discloses a method of forming an explosion-proof valve by press-working a single metal plate. In the method of Patent document 1, a single metal plate is coined to form a reduced thickness section thinner than a substrate section, and then, a groove is formed in the reduced thickness section along the periphery thereof. A portion of the reduced thickness section where the groove is formed is even further reduced in thickness compared to the remainder of the reduced thickness section in order to ensure the rupture of the explosion-proof valve when the internal pressure exceeds a predetermined value. In addition, in the method of Patent document 1, after the groove is formed, annealing is performed so that the operational pressure of the work-hardened explosion-proof valve can be controlled.

PRIOR ART DOCUMENT

Patent Document

Patent document 1: Japanese Patent No. 3222418

DISCLOSURE OF THE INVENTION

Problems to be Solved by the Invention

When the reduced thickness section is formed by press-working the metal plate through a process such as coining, and then the groove is formed in the reduced thickness section, however, there has been a problem that the metal plate workpiece (work), which is work-hardened, is prone to crack in the groove formation process. Especially in recent years, there has been another problem that conventional manufacturing methods cannot respond to the needs of the downsizing and the reduction in thickness of secondary batteries. Further, in the method of Patent document 1, the metal plate workpiece is work-hardened and thus needs to be annealed to be softened so that the operational pressure of the explosion-proof valve can be controlled. Accordingly, the method of Patent document 1 has a problem of complicated manufacturing process. In addition, the explosion-proof valve, which is reduced in thickness, needs to be protected from external force, heat, and the like.

The present invention has been made from the above view point and an objective of the present invention is to provide a battery case lid which inhibits work hardening of a metal plate workpiece and which is easy to manufacture and a manufacturing method for the battery case lid. Another objective of the present invention is to provide a battery case lid which is easy to manufacture and which enables protection of the periphery of an explosion-proof valve.

Means to Solve the Problems

The present invention has been made to solve the above problems, and it is an objective of a first aspect of the present invention to provide a battery case lid formed by working a metal plate, the battery case lid comprising: a substrate section; and an explosion-proof valve formed in the substrate section, wherein the explosion-proof valve has a reduced thickness section thinner than the substrate section, and the reduced thickness section is formed by extending the metal plate by applying pressure with the metal plate kept unrestrained.

According to the above configuration, since the metal plate is pushed in an unrestrained state, a reduction is made in an amount of strains introduced at the formation of the reduced thickness section, and as a result, work hardening of the metal plate workpiece is inhibited. This prevents crack of the reduced thickness section at the formation of, for example, a groove in the reduced thickness section. Moreover, since work hardening of the metal plate workpiece is inhibited, the annealing process may be omitted, reducing the number of operational steps.

Further, preferably, the reduced thickness section has a groove. According to the above configuration, since a portion where the groove is formed is even further reduced in thickness, the rupture of the groove is ensured when the internal pressure exceeds a predetermined value.

Further, preferably, the explosion-proof valve is surrounded by a cylindrical wall portion thicker than the reduced thickness section. Moreover, preferably, the explosion-proof valve is surrounded by a folded part thicker than the reduced thickness section, the folded part being formed by folding the metal plate. According to the above configuration, the reduced thickness section can be protected.

It is an objective of a second aspect of the present invention to provide a manufacturing method for a battery case lid including an explosion-proof valve, the manufacturing method comprising: an extending step of pushing an extending punch from a first side of a metal plate disposed over an extending die having a recess, to form a reduced thickness section constituting the explosion-proof valve, wherein the recess has an inner diameter greater than an outer diameter of the extending punch, and wherein in the extending step, the extending punch is pushed while the metal plate is kept unrestrained, and the metal plate is pressed to be extended between a bottom face of the recess and a pressing face of the extending punch, to form the reduced thickness section.

According to the above manufacturing method, since the metal plate is pushed by the extending punch while being kept unrestrained, a reduction is made in an amount of strains introduced at the formation of the reduced thickness section, and as a result, work hardening of the metal plate workpiece is inhibited. This prevents crack of the reduced thickness section at the formation of, for example, a groove in the reduced thickness section. Moreover, since work hardening of the metal plate workpiece is inhibited, the annealing process may be omitted, reducing the number of operational steps.

Further, preferably, the above manufacturing method further comprises a groove forming step of forming a groove in the reduced thickness section. According to the above configuration, since a portion where the groove is formed is even further reduced in thickness, the rupture of the groove is ensured when the internal pressure exceeds a predetermined value.

Further, preferably, in the extending step, a cylindrical wall portion is formed around the reduced thickness section, the cylindrical wall portion having a height greater than a depth of the recess of the extending die. According to the above manufacturing method, a reduction is made in an amount of strains introduced at the formation of the reduced thickness section.

Further, preferably, the extending step is followed by a bending step in which the reduced thickness section is pressed by a bending punch smaller in outer diameter than the reduced thickness section from a second side of the metal plate, to bend a cylindrical wall portion formed around the reduced thickness section.

According to the above configuration, since the height of the cylindrical wall portion can be reduced, the height of the battery case lid can be reduced.

Further, preferably, the bending step is followed by a folding step in which a bent portion formed by bending the cylindrical wall portion in the bending step is pushed by a folding punch from the second side of the metal plate, to fold the bent portion.

According to the above configuration, since the height of the cylindrical wall portion can be reduced, the height of the battery case lid can be reduced. Moreover, since the explosion-proof valve is surrounded by the part formed thick by folding the metal plate, the peripheral area of the explosion-proof valve can be protected.

Further, preferably, a clearance between a side face of the recess of the extending die and the extending punch is set to be smaller than a thickness of the metal plate.

If the clearance between the side face of the recess and the extending punch is equal to or greater than the thickness of the metal plate, there are cases where strains (creases) occur in a portion of the metal plate workpiece which is not sandwiched between the extending die and the extending punch during the operation of extending the metal plate workpiece by applying pressure to form the reduced thickness section, an operation subsequent to drawing the metal plate workpiece into the extending die.

According to the above configuration, the clearance c between the side face of the recess and the extending punch is set to be smaller than the thickness of the metal plate. Because a portion of the metal plate workpiece that first starts moving in the extending step is a portion thereof sandwiched between the extending die and the extending punch, the above configuration can serve to reduce strains in a portion of the metal plate workpiece which is not sandwiched between the extending die and the extending punch, and consequently improves the quality of the product.

Further, preferably, the pressing face of the extending punch has a spherical face which is convex in a pressing direction of the extending punch.

According to the above configuration, since the metal plate workpiece is pressed to be extended radially from the center of the metal plate workpiece, the reduced thickness section can have a uniform thickness.

Further, preferably, a side face of the extending punch has a top section with a lateral protrusion formed thereon.

According to the above manufacturing method, friction between the side face of the extending punch and the metal plate workpiece at the working can be avoided. This prevents the metal plate workpiece from being deformed due to friction resistance.

Further, preferably, the extending step is followed by a correcting step in which the reduced thickness section is corrected to be flat. In performing the extending step, there are cases where the reduced thickness section becomes slightly convex in the pushing direction of the punch. According to the above configuration, the reduced thickness section can be flattened.

It is an objective of a third aspect of the present invention to provide a battery case lid formed by working a metal plate, the battery case lid comprising: a substrate section; and an explosion-proof valve formed in the substrate section, wherein the explosion-proof valve has a reduced thickness section thinner than the substrate section, and the explosion-proof valve is surrounded by a cylindrical wall portion thicker than the reduced thickness section.

It is an objective of a fourth aspect of the present invention to provide a battery case lid formed by working a metal plate, the battery case lid comprising: a substrate section; and an explosion-proof valve formed in the substrate section, wherein the explosion-proof valve has a reduced thickness section thinner than the substrate section, and the explosion-proof valve is surrounded by a folded part thicker than the reduced thickness section, the folded part being formed by folding the metal plate.

According to the above configuration, the reduced thickness section can be protected.

Further, preferably, the reduced thickness section has a groove. According to the above configuration, since a portion where the groove is formed is even further reduced in thickness, the rupture of the groove is ensured when the internal pressure exceeds a predetermined value.

Effect of the Invention

The battery case lid and the manufacturing method for the battery case lid according to the present invention inhibit work hardening of a metal plate workpiece and facilitate manufacture of a battery case lid. Further, the battery case lid according to the present invention enables protection of the periphery of an explosion-proof valve.

EMBODIMENT FOR CARRYING OUT THE INVENTION

Figure 1:
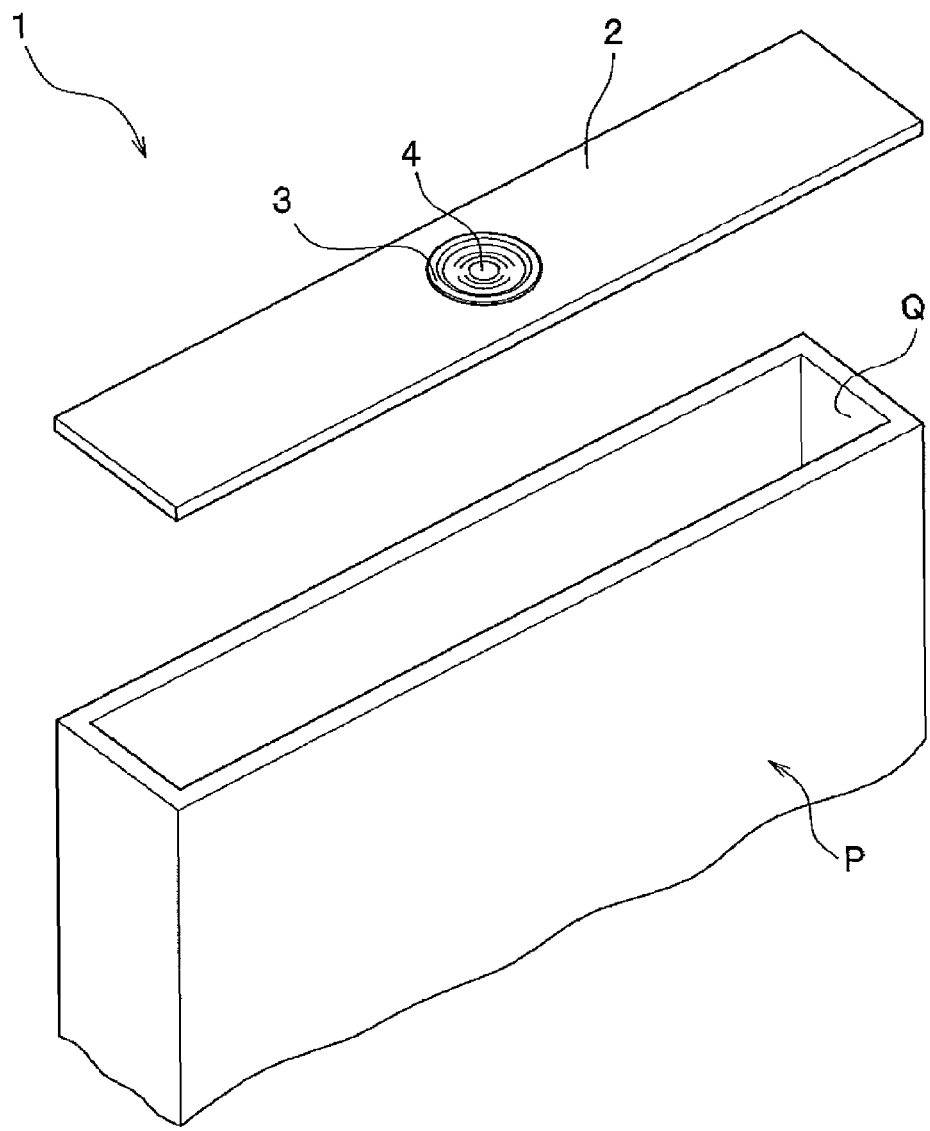
FIG. 1 is a perspective view of a battery case and a battery case lid according to the present embodiment.
Figure 1:
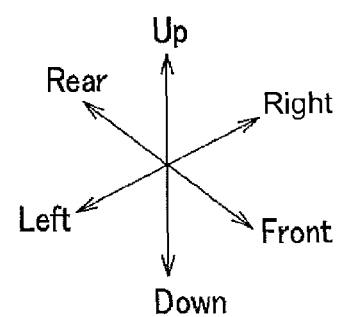

An embodiment of the present invention will be described in detail with reference to the drawings. First, the configuration of a battery case lid 1 will be described. As shown in FIG. 1, the battery case lid 1 according to the present embodiment is a metal plate member that closes an opening Q of a battery case P for use in a secondary battery. The battery case P is filled with an electrolyte. The battery case P and the battery case lid 1 are welded to each other to hermetically seal the battery case P. In the description, the directions of up, down, right, left, front, and rear are as indicated by the arrows in FIG. 1.

As shown in FIG. 1, the battery case lid 1 includes a substrate section 2, a folded part 3, and an explosion-proof valve 4. The battery case lid 1 is formed by working a single aluminum alloy plate. The material of the battery case lid 1 is not limited to an aluminum alloy and may be other metals such as copper and iron.

The substrate section 2 is a flat plate member that closes the opening Q of the battery case P. In plan view, the substrate section 2 is rectangular in shape to fit the opening Q. The substrate section 2 has a uniform thickness of, for example, 1.2 mm-3.0 mm. The shape of the substrate section 2 may be altered properly according to the shape of the opening Q. The substrate section 2 has a through hole for insertion of an electrode, an injection hole for injection of an electrolyte, and the like hole, illustration of such holes being omitted.

Figure 2A:
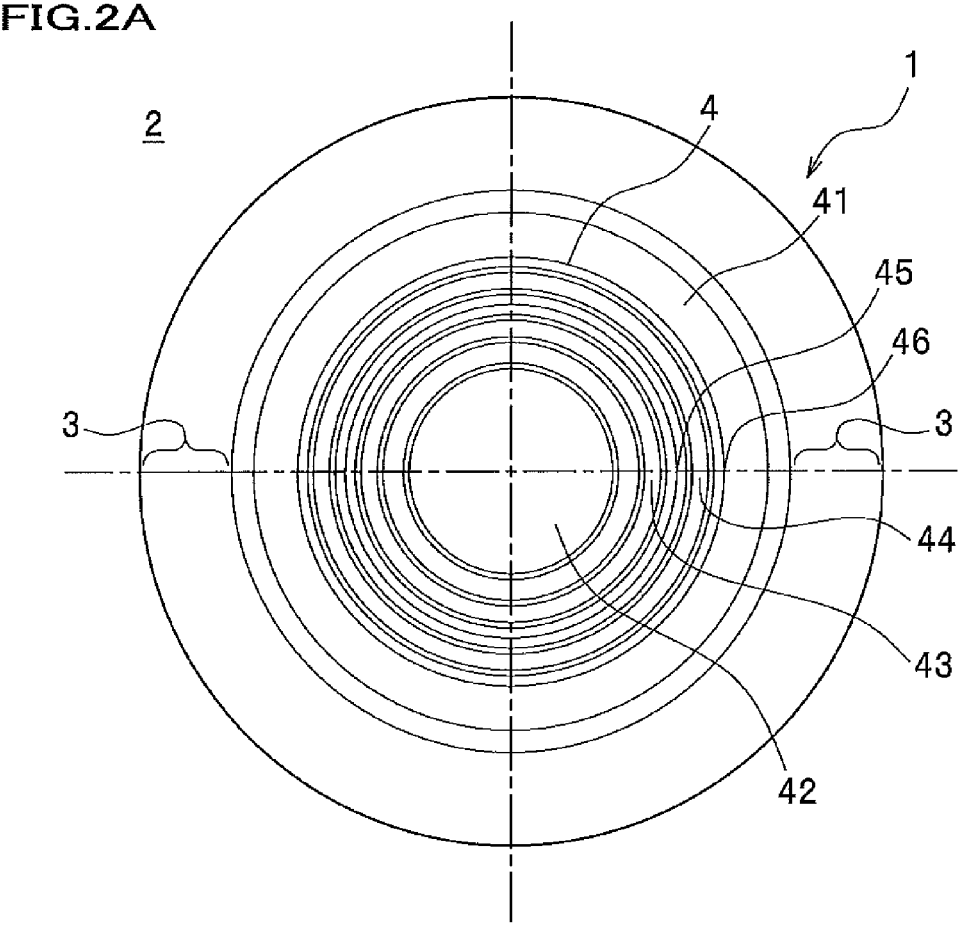
FIG. 2A is a plan view of the battery case lid according to the present embodiment.
Figure 2B:
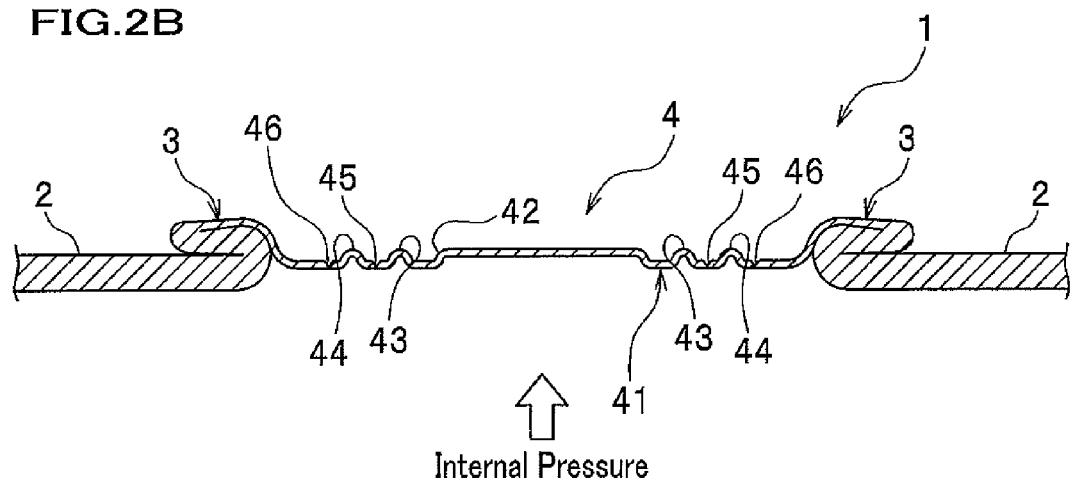
FIG. 2B is a cross sectional view thereof.

As shown in FIGS. 2A and 2B, the folded part 3 is a part folded in three ring-shaped metal-plate layers formed in the substrate section 2. The folded part 3 extends around the entire outer periphery of the explosion-proof valve 4. The folded part 3 is increased in thickness compared to the substrate section 2 in order to protect (reinforce) the periphery of the explosion-proof valve 4. The metal-plate layers forming the folded part 3 are gradually decreased in thickness from the bottom to the top layer. The folded part 3 may have any thickness as long as it is thicker than the substrate section 2. According to the present embodiment, the folded part 3 has a thickness about double the thickness of the substrate section 2. The folded part 3 is formed in folding steps to be described later.

Figure 3:
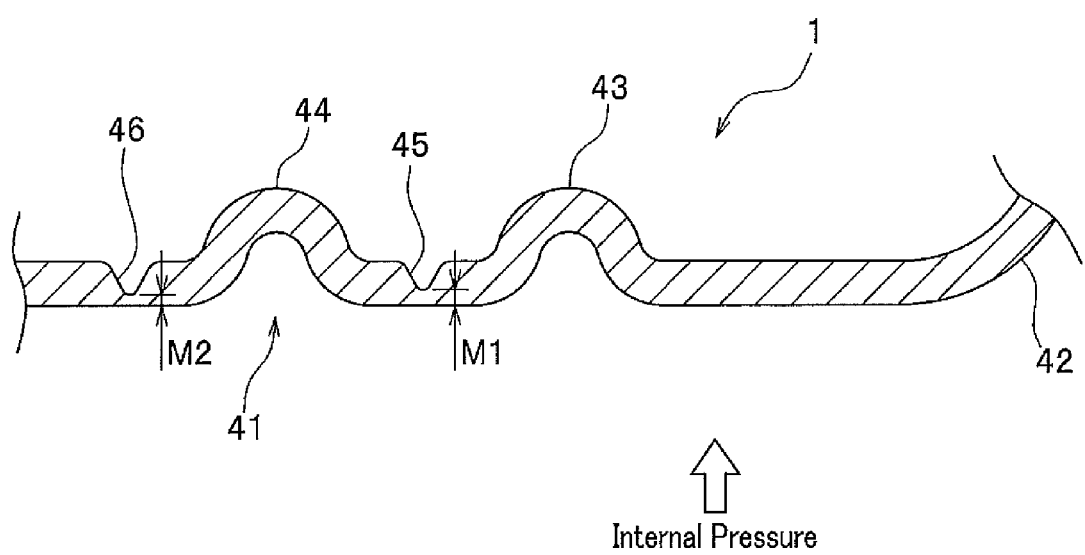
FIG. 3 is an enlarged cross sectional view showing a first groove and a second groove according to the present embodiment.

As shown in FIGS. 2A and 2B and FIG. 3, the explosion-proof valve 4 is located inside the folded part 3. The explosion-proof valve 4 is a valve designed to rupture to release the internal pressure from inside the battery case P when the internal pressure exceeds a predetermined value. The explosion-proof valve 4 includes a central elevation 42, a first ridge 43, a second ridge 44, a first groove 45, and a second groove 46, all formed in a reduced thickness section 41.

The reduced thickness section 41 has a circular shape in plan view and is decreased in thickness compared to the substrate section 2. The thickness of the reduced thickness section 41 is set properly according to the operational pressure at which the internal pressure is released, and is set, for example, to 0.1 mm-1.5 mm. The reduced thickness section 41 is positioned approximately at the same height as the upper face of the substrate section 2.

The central elevation 42 is formed in the center of the reduced thickness section 41. The central elevation 42 has a circular shape in plan view and is raised upward from the reduced thickness section 41. The central elevation 42, which is formed in the center of the explosion-proof valve 4 and raised upward, is more susceptible to the internal pressure from inside the battery case P.

The first ridge 43 and the second ridge 44 each have a ring shape extending along the periphery of the central elevation 42 and are protruded upward from the reduced thickness section 41. The first ridge 43 and the second ridge 44 are concentric with the explosion-proof valve 4. The first ridge 43 is located inside the second ridge 44. The first ridge 43 and the second ridge 44 are portions formed for removing excess metal (spread away metal) produced in the formation of the first groove 45 and the second groove 46, so that the first ridge 43 and the second ridge 44 are located along the first groove 45 and the second groove 46.

According to the present embodiment, two ridges are formed. However, no ridges may be formed. Further, since two grooves (the first groove 45 and the second groove 46) are formed according to the present embodiment, there may be another ridge outside the second groove 46. Moreover, the ridges, which are protruded upward according to the present embodiment, may be protruded downward instead.

As shown in FIGS. 2A and 2B, the first groove 45 and the second groove 46 are ring-shaped grooves formed in the upper face of the reduced thickness section 41. The first groove 45 and the second groove 46 are concentric with the explosion-proof valve 4. The first groove 45 is located between the first ridge 43 and the second ridge 44, and the second groove 46 is located outside the second ridge 44.

As shown in FIG. 3, each of the first groove 45 and the second groove 46 is V-shaped in cross section. In other words, each of the first groove 45 and the second groove 46 is open up with its width gradually increasing from bottom to top. The portions where the first groove 45 and the second groove 46 are formed are even further reduced in thickness compared to the remainder of the reduced thickness section 41. Thus, at least one of the first groove 45 and the second groove 46 easily ruptures when the internal pressure from inside the battery case P exceeds the predetermined value. The thickness of the portions of the reduced thickness section 41 where the first groove 45 and the second groove 46 are formed, which are thicknesses M1 and M2, respectively, are set properly according to the operational pressure to be set.

In addition, the first groove 45 and the second groove 46 may be identical or different from each other in both cross section and plan view. Further, one of the first groove 45 and the second groove 46 may be deeper than the other. Further, the first groove 45 and the second groove 46 may have another shape than the V-shape in cross section. Moreover, one or three or more grooves may be formed instead of two as in the present embodiment.

Next, a manufacturing method for the battery case lid 1 will be described.

Figure 4:
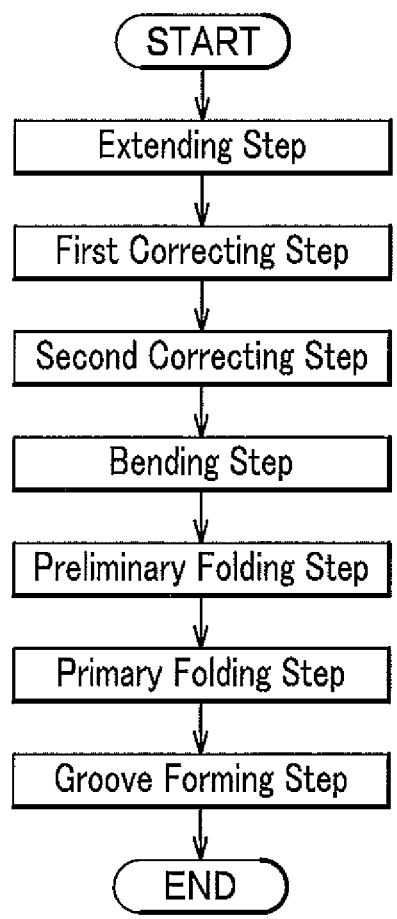
FIG. 4 is a flowchart of a manufacturing method according to the present embodiment.

As shown in FIG. 4, the manufacturing method for the battery case lid 1 according to the present embodiment includes an extending step, a first correcting step, a second correcting step, a bending step, a preliminary folding step, a primary folding step, and a groove forming step.

Figure 5A:
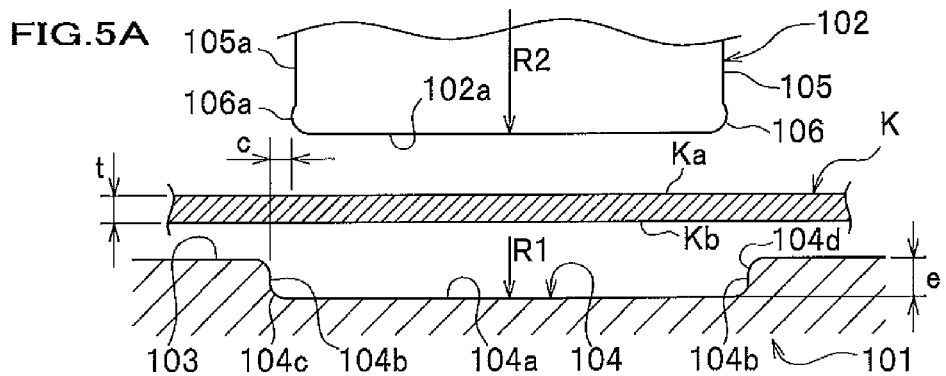
FIGS. 5A-5D are cross sectional views showing step by step an extending step according to the present embodiment.

In the manufacturing method for the battery case lid 1 according to the present embodiment, a single metal plate K is worked to form the battery case lid 1, as shown in FIG. 5A. According to the present embodiment, the metal plate K is an aluminum alloy plate. The metal plate K has a thickness t set properly to, for example, 1.0 mm-3.0 mm according to the application of the secondary battery. The thickness t of the metal plate K is equal to the thickness of the substrate section 2 of the battery case lid 1.

<Extending Step>

In the extending step, as shown in FIGS. 5A-5D, by working the metal plate K, a metal plate workpiece K1 is formed with the substrate section 2, a cylindrical wall portion 31, and the reduced thickness section 41. In the extending step, there are used an extending die 101 as a lower die and an extending punch 102 as an upper die.

As shown in FIG. 5A, the extending die 101 is a die including a flat upper face 103 and a recess 104 formed therein. The recess 104 has a circular shape in plan view, and has a bottom face 104a and a side face 104b upstanding relative to the bottom face 104a. The side face 104b is cylindrical. An internal corner portion 104c between the bottom face 104a and the side face 104b has a peripheral portion arc-shaped in cross section. An external corner portion 104d between the side face 104b and the upper face 103 has a peripheral portion arc-shaped in cross section. The recess 104 has a depth e (a distance from the upper face 103 to a place of the bottom face 104a where the recess 104 has a greatest depth) which is slightly greater than the thickness t of the metal plate K according to the present embodiment. The bottom face 104a of the recess 104 may be flat, but according to the present embodiment, it is constituted of a spherical face which is slightly downwardly convex. The spherical face of the bottom face 104a has a curvature radius R1 of, for example, 1000 mm-1500 mm.

The extending punch 102 is a die that moves up and down relative to the extending die 101 and has a body portion 105 and a protrusion 106 formed on the body portion 105. The extending punch 102 moves up and down coaxially with the recess 104 of the extending die 101. The body portion 105 has a columnar shape having the pressing face 102a on the lower end. The pressing face 102a may be flat, but according to the present embodiment, it is constituted of a spherical face which is slightly downwardly convex. The spherical face of the pressing face 102a has a curvature radius R2 of, for example, 1000 mm-1500 mm. Preferably, the curvature radius R2 of the spherical face of the pressing face 102a is equal to or smaller than the curvature radius R1 of the spherical face of the bottom face 104a of the recess 104.

The protrusion 106, at the end of the body portion 105, is slightly protruded laterally from a side face 105a of the body portion 105 along the entire periphery thereof. The protrusion 106 has a semi-circular shape protruding outwardly in cross section. According to the present embodiment, the arc in the cross section of the protrusion 106, the arc in the cross section of the internal corner portion 104c, and the arc in the cross section of the external corner portion 104d have the same curvature radius.

As shown in FIG. 5A, a clearance c is formed between the side face 104b of the recess 104 and the outer periphery of the protrusion 106 (in the present embodiment, the outer periphery including an apex line 106a). According to the present embodiment, the clearance c is smaller than the thickness t of the metal plate K.

Figure 5B:
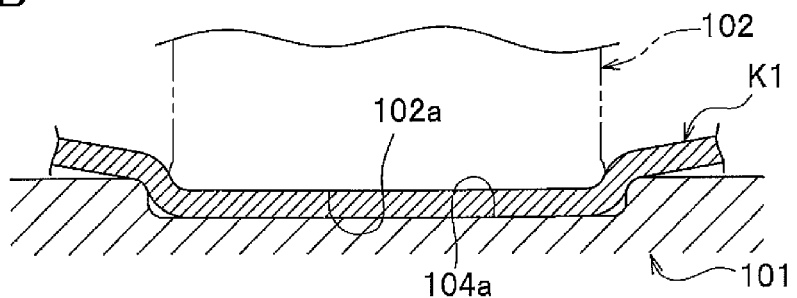
Figure 5C:
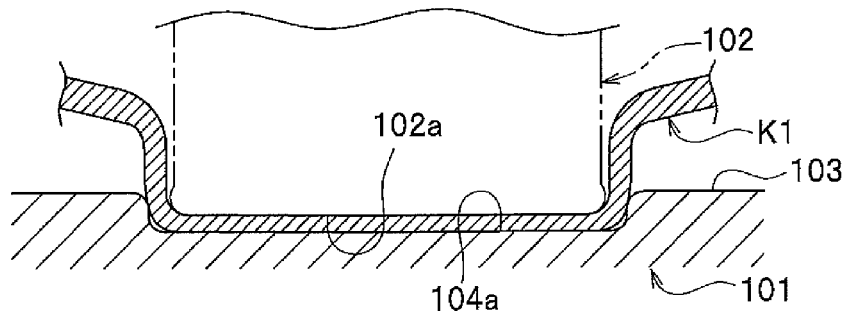
Figure 5D:
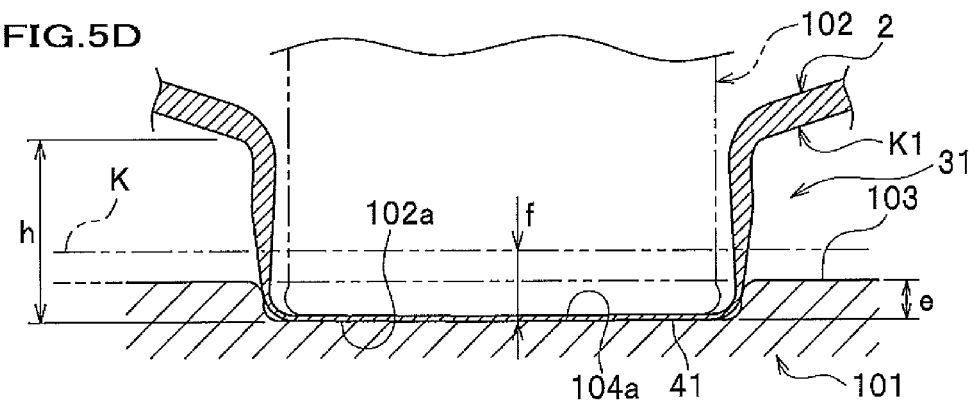

In the extending step, as shown in FIGS. 5A-5D, the extending punch 102 is moved down from one face Ka side of the metal plate K that is positioned over the extending die 101. Then, when the metal plate workpiece K1 is deformed to come into contact with the bottom face 104a as shown in FIG. 5B, the extending punch 102 is moved further down as shown in FIGS. 5C and 5D. According to the present embodiment, in order to form the reduced thickness section 41 to a thickness of, for example, 0.3 mm, the extending punch 102 is descended to a position wherein the distance between the pressing face 102a and the bottom face 104a is 0.3 mm.

When the extending punch 102 is descended, pressure is applied to extend a portion of the metal plate workpiece K1 that is sandwiched between the pressing face 102a and the bottom face 104a, while gradually reducing the thickness of that portion of the metal plate workpiece K1 and spreading the metal away radially from the center of the extending punch 102. The spread away metal comes into contact with the side face 104b of the recess 104, and changes its direction to flow vertically upward. Accordingly, the metal plate workpiece K1 is made to have the substrate section 2, the cylindrical wall portion 31 formed as a result of the depression of the substrate section 2, and the reduced thickness section 41 formed at a bottom face of the cylindrical wall portion 31. The substrate section 2 is formed extending over the extending die 101 at the formation of the cylindrical wall portion 31.

The cylindrical wall portion 31 has a height h which, according to the present embodiment, is, for example, about 10 mm. The height h is greater than the depth e of the recess 104 of the extending die 101. In addition, a pushed-in distance f of the extending punch 102 (a distance between the position where the pressing face 102a contacts the metal plate K and the lowest position of the pressing face 102a) is greater than the depth e of the recess 104 of the extending die 101.

If the clearance c between the side face 104b of the recess 104 and the extending punch 102 is equal to or greater than the thickness t of the metal plate K, strains (creases) occur in a portion of the metal plate workpiece K1 which is not sandwiched between the extending die 101 and the extending punch 102, i.e., in a portion forming the cylindrical wall portion 31, during the operation of extending the metal plate workpiece K1 by applying pressure to form the reduced thickness section 41, an operation subsequent to drawing the metal plate workpiece K1 into the extending die 101. The strains adversely affect working stability in the next operation and thereafter.

According to the present embodiment, the clearance c between the side face 104b of the recess 104 and the extending punch 102 is set to be smaller than the thickness t of the metal plate K. Because a portion of the metal plate workpiece K1 that first starts moving in the extending step is the portion of the metal plate workpiece K1 sandwiched between the extending die 101 and the extending punch 102, that is, the portion forming the reduced thickness section 41, the above configuration can serve to reduce strains in the portion of the metal plate workpiece K1 which is not sandwiched between the extending die 101 and the extending punch 102. The reduction of strains improves the working stability in the next operation and thereafter, and consequently improves the quality of the product. Here, if the relationship between the clearance c and the thickness t is 0.8 t≈c, the height h of the cylindrical wall portion 31 is about 10 mm.

Figure 6:
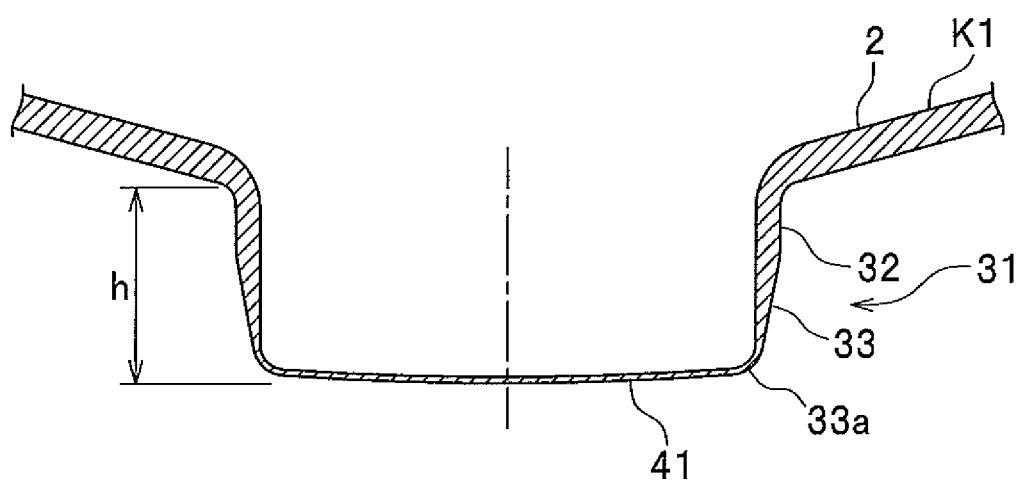
FIG. 6 is a cross sectional view of a metal plate workpiece after the extending step according to the present embodiment.

FIG. 6 shows the metal plate workpiece having gone through the extending step. As shown in FIG. 6, the substrate section 2 of the metal plate workpiece K1 is tilted diagonally upward relative to the horizontal plane due to spring back. The cylindrical wall portion 31 has a relatively thick base portion 32 and a tapered portion 33. The tapered portion 33 gradually decreases in thickness from an end portion of the base portion 32 to the reduced thickness section 41. An internal corner portion 33a, formed between the tapered portion 33 and the reduced thickness section 41, has a peripheral portion arc-shaped in cross section. The tapered portion 33 has a taper wherein the thickness reduces gradually from top to bottom because the metal flowing out of the recess 104 gradually decreases in amount with the progress of the extending step of forming the reduced thickness section 41.

The reduced thickness section 41 is slightly convex in the pushing direction of the extending punch 102 (in FIG. 6, downwardly).

<First Correcting Step>

Figure 7A:
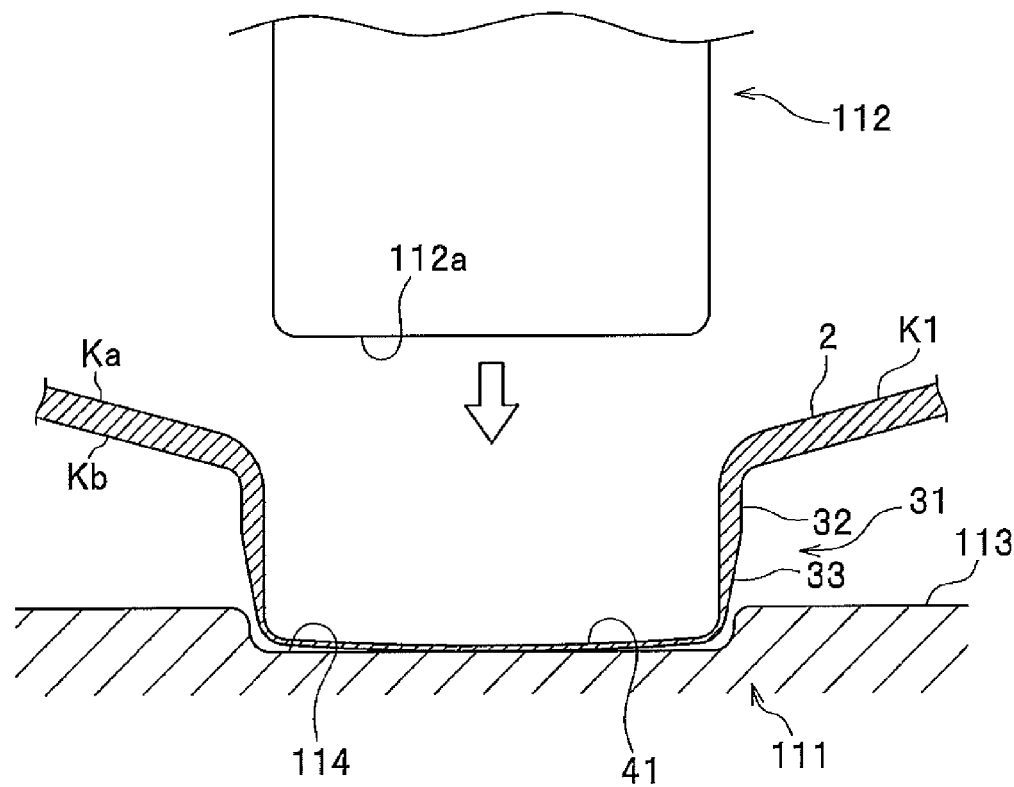
FIGS. 7A and 7B are respectively cross sectional views of the metal plate workpiece before and after a first correcting step according to the present embodiment.
Figure 7B:
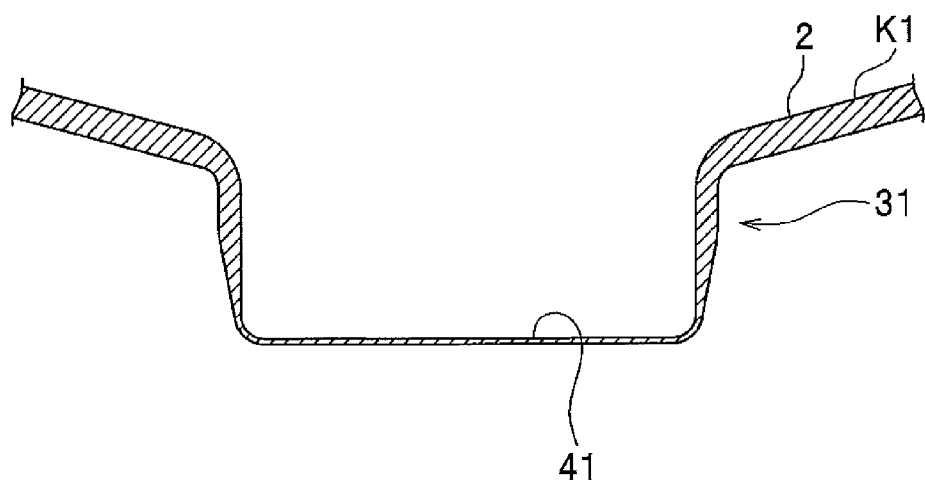

In the first correcting step, as shown in FIGS. 7A and 7B, the reduced thickness section 41 of the metal plate workpiece K1 is corrected to be flat. In the first correcting step, there are used a first correcting die 111 as a lower die and a first correcting punch 112 as an upper die.

The first correcting die 111 is a die having a recess 114 in an upper face 113. The recess 114 is circular in plan view and has a diameter slightly greater than the outer diameter of the reduced thickness section 41. The recess 114 has a depth smaller than the height of the cylindrical wall portion 31. The recess 114 has a flat bottom face.

The first correcting punch 112 is a die having a columnar shape. The first correcting punch 112 has an outer diameter slightly smaller than the inner diameter of the cylindrical wall portion 31. The first correcting punch 112 moves up and down coaxially with the recess 114 of the first correcting die 111. The first correcting punch 112 has a flat pressing face 112a.

In the first correcting step, the metal plate workpiece K1 is placed with the reduced thickness section 41 within the recess 114 and with one face Ka of the metal plate workpiece K1 up. In this state, the first correcting punch 112 is pressed against the reduced thickness section 41 so that the reduced thickness section 41 is corrected to be flat as shown in FIG. 7B.

<Second Correcting Step>

Figure 8A:
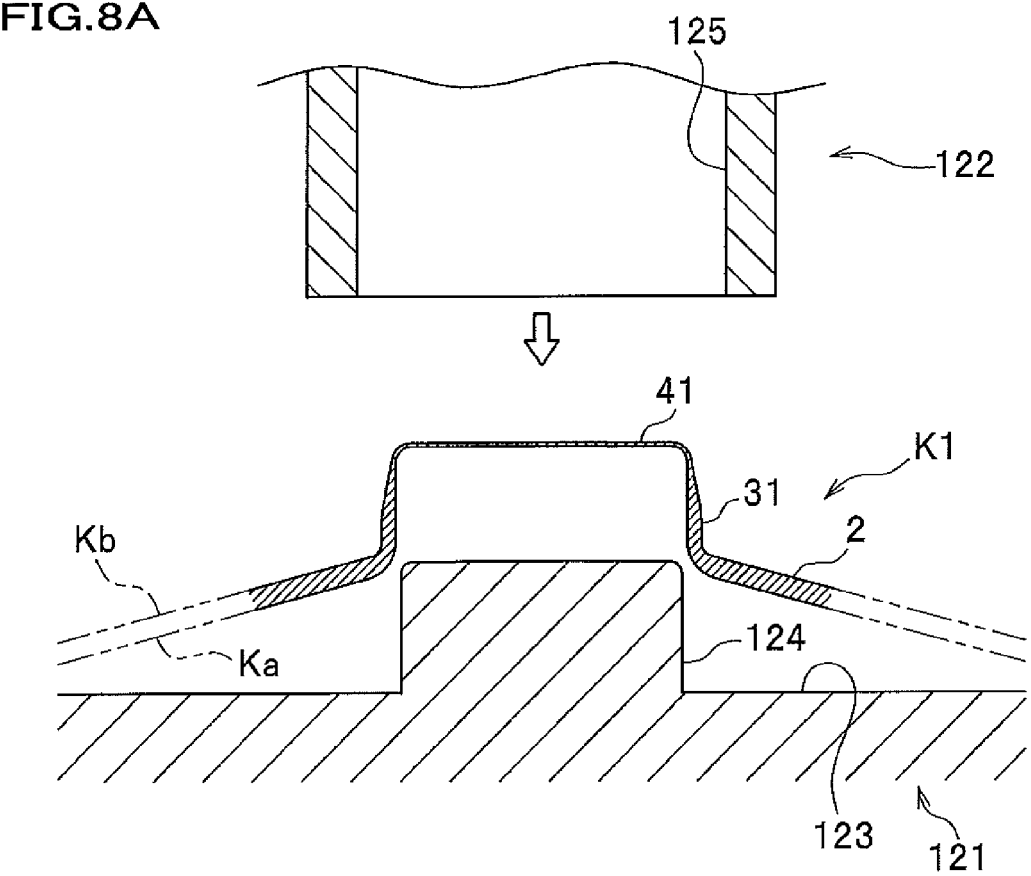
FIGS. 8A and 8B are respectively cross sectional views of the metal plate workpiece before and after a second correcting step according to the present embodiment.
Figure 8B:
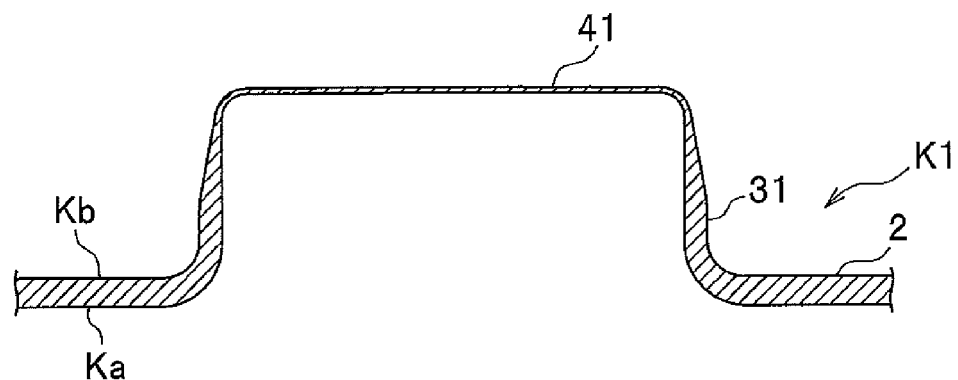

In the second correcting step, as shown in FIGS. 8A and 8B, the cylindrical wall portion 31 is corrected to be perpendicular to the substrate section 2 of the metal plate workpiece K1. In the second correcting step, there are used a second correcting die 121 and a second correcting punch 122, as shown in FIG. 8A.

The second correcting die 121 is a die having a protruded portion 124 on a flat upper face 123. The protruded portion 124 has a columnar shape and has an outer diameter slightly smaller than the inner diameter of the cylindrical wall portion 31. The protruded portion 124 has a flat upper face. The protruded portion 124 has a height approximately equal to that of the cylindrical wall portion 31.

The second correcting punch 122 is a die having a cylindrical shape. The second correcting punch 122 has a hollow inside an inner surface 125 with an inner diameter thereof greater than the outer diameter of the cylindrical wall portion 31. The second correcting punch 122 moves up and down coaxially with the protruded portion 124 of the second correcting die 121.

In the second correcting step, the metal plate workpiece K1 is placed upside down over the second correcting die 121 with the other face Kb up and with the reduced thickness section 41 positioned over the protruded portion 124. Then, the second correcting punch 122 is pressed against the metal plate workpiece K1. In the second correcting step, the cylindrical wall portion 31 is corrected to be perpendicular to the substrate section 2 of the metal plate workpiece K1, as shown in FIG. 8B.

<Bending Step>

Figure 9A:
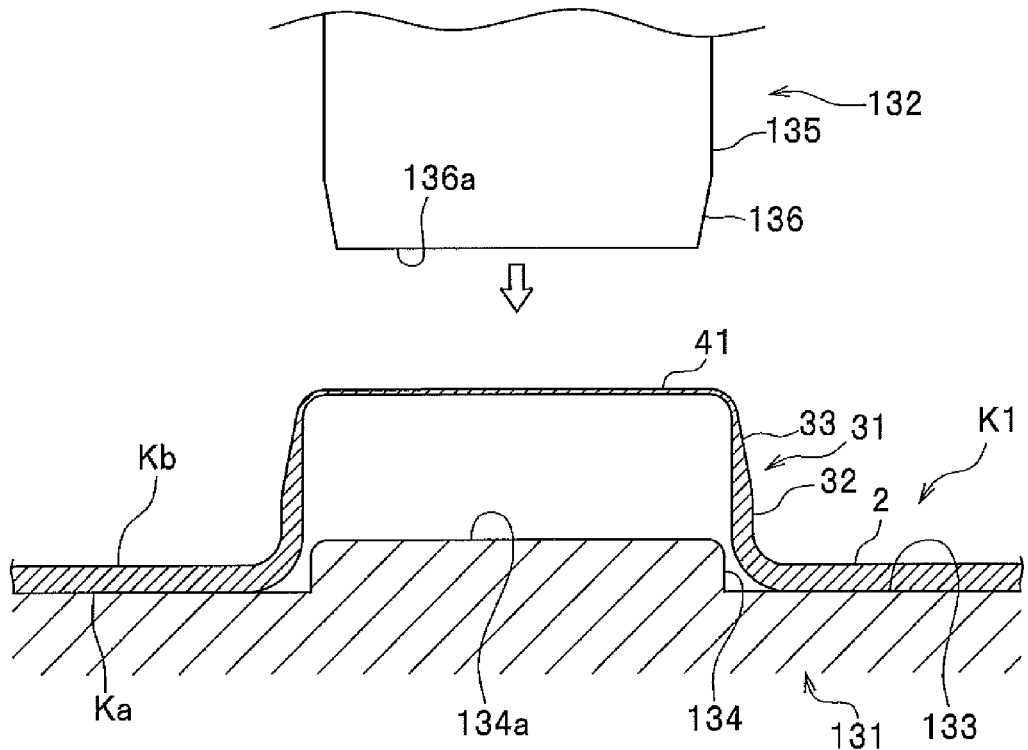
FIGS. 9A and 9B are respectively cross sectional views of the metal plate workpiece before and after a bending step according to the present embodiment.
Figure 9B:
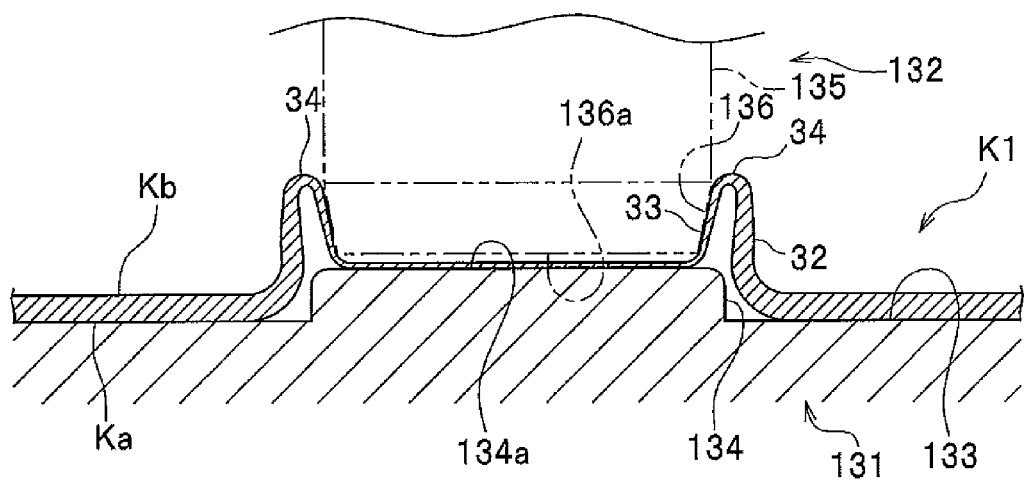

In the bending step, as shown in FIGS. 9A and 9B, the reduced thickness section 41 of the metal plate workpiece K1 is bent back. In the bending step, there are used a bending die 131 as a lower die and a bending punch 132.

The bending die 131 is a die having a protruded portion 134 on a flat upper face 133. The protruded portion 134 has an approximately columnar shape. The protruded portion 134 has an outer diameter smaller than the inner diameter of the cylindrical wall portion 31. The protruded portion 134 has a flat upper face 134a. The protruded portion 134 has a height about one fourth of the height of the cylindrical wall portion 31.

The bending punch 132 is a die having an approximately columnar shape. The bending punch 132 has a body portion 135 and a radially diminishing portion 136 extending from the bottom of the body portion 135. The radially diminishing portion 136 diminishes gradually in radius from top to bottom. The bending punch 132 moves up and down coaxially with the protruded portion 134 of the bending die 131. The body portion 135 has an outer diameter smaller than the inner diameter of the cylindrical wall portion 31. The radially diminishing portion 136 has a pressing face 136a with a diameter smaller than the inner diameter of the reduced thickness section 41.

In the bending step, the metal plate K1 is placed on the bending die 131 with the other face Kb of the metal plate workpiece K1 up and with the reduced thickness section 41 positioned over the protruded portion 134. Then, the bending punch 132 is pressed downward against the reduced thickness section 41 to the extent that the reduced thickness section 41 contacts the protruded portion 134, as shown in FIG. 9B. As a result, the height of the reduced thickness section 41 is reduced to approximately two thirds of the height thereof before the bending step, the tapered portion 33 of the cylindrical wall portion 31 is turned back inside, and also the base portion 32 is moved slightly outward. A portion bent by the turning back of the tapered portion 33 is referred to as a bent portion 34. The bent portion 34 is formed in a ring shape in plan view.

<Preliminary Folding Step>

Figure 10A:
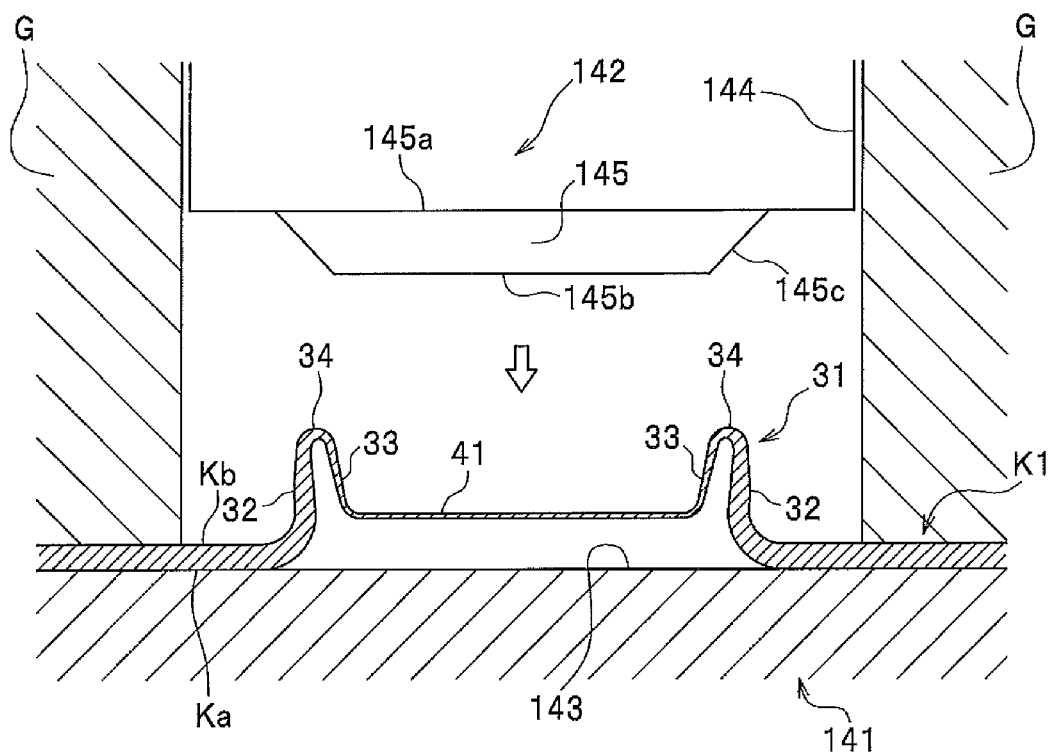
FIGS. 10A and 10B are respectively cross sectional views of the metal plate workpiece before and after a preliminary folding step according to the present embodiment.
Figure 10B:
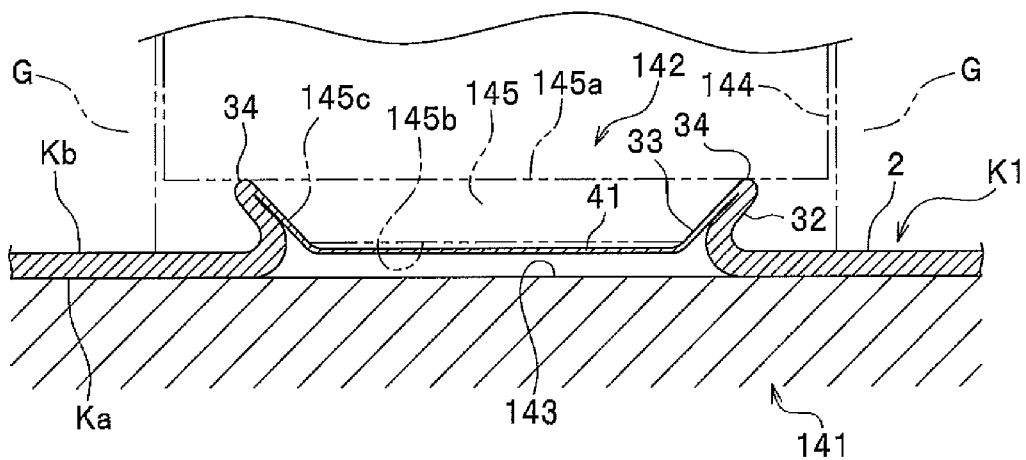

In the preliminary folding step, as shown in FIGS. 10A and 10B, the bent portion 34 of the metal plate workpiece K1 is pushed open outward to be folded halfway to the direction toward the substrate section 2. In other words, the preliminary folding step is a preliminary step to ensure folding of the cylindrical wall portion 31. In the preliminary folding step, there are used a preliminary folding die 141 as a lower die, a preliminary folding punch 142 as an upper die, and a holding means G.

The preliminary folding die 141 is a die having an upper face 143. The holding means G is a member for holding the metal plate workpiece K1 against the upper face 143.

The preliminary folding punch 142 is a die having a columnar shape, and moves up and down relative to the preliminary folding die 141. The preliminary folding punch 142 has a body portion 144 and a bottom portion 145 extending from the bottom of the body portion 144. The body portion 144 has a diameter greater than the outer diameter of the base portion 32 of the cylindrical wall portion 31. The bottom portion 145 has the shape of a truncated cone with a downwardly reducing diameter. The bottom portion 145 has an upper end 145*a* with a diameter slightly greater than the outer diameter of the base portion 32. The bottom portion 145 has a pressing face 145*b* with a diameter approximately equal to the diameter of the reduced thickness section 41.

In the preliminary folding step, the upper face 143 and the holding means G are used to immobilize the metal plate workpiece K1 placed on the preliminary folding die 141 with the other face Kb of the metal plate workpiece K1 up. Then, the reduced thickness section 41 is pushed downward with the pressing face 145*b* while the bent portion 34 is being pushed open outward with a taper 145*c* of the bottom portion 145 of the preliminary folding punch 142. This brings the base portion 32 and the tapered portion 33 into a face-to-face contact, and reduces the height between the substrate section 2 and the top of the bent portion 34 to half the height before the preliminary folding step, as shown in FIG. 10B. In addition, the lower surface of the reduced thickness section 41 is brought to approximately the same height as the upper face of the substrate section 2.

<Primary Folding Step>

Figure 11A:
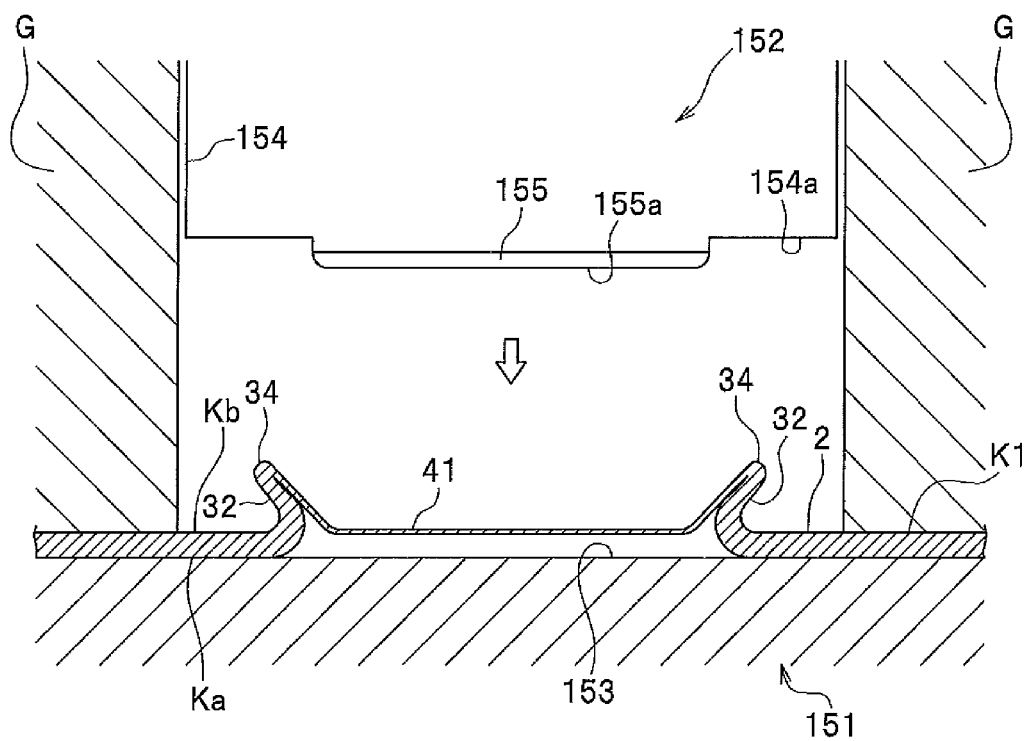
FIGS. 11A and 11B are respectively cross sectional views of the metal plate workpiece before and after a primary folding step according to the present embodiment.
Figure 11B:
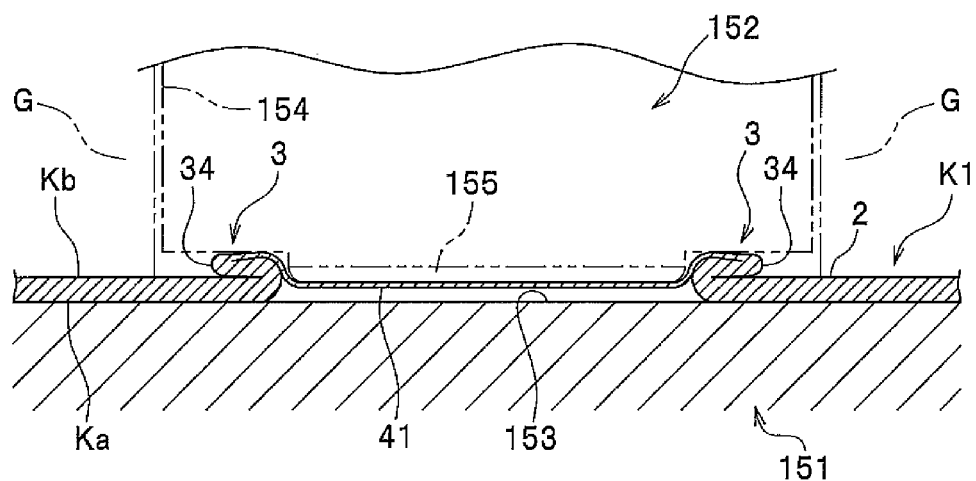

In a primary folding step, as shown in FIGS. 11A and 11B, the bent portion 34 of the metal plate workpiece K1 is pushed open outward to be folded fully onto the substrate section 2. In the primary folding step, there are used a primary folding die 151 as a lower die, a primary folding punch 152 as an upper die, and the holding means G.

The primary folding die 151 is a die having a flat upper face 153. The holding means G is a member for holding the metal plate workpiece K1 against the upper face 153.

The primary folding punch 152 is a die having an approximately columnar shape. The primary folding punch 152 moves up and down relative to the primary folding die 151. The primary folding punch 152 has a body portion 154 and a protruded portion 155 extending from a lower surface 154*a* of the body portion 154. The body portion 154 has an outer diameter greater than the outer diameter of the base portion 32. The lower surface 154*a* of the body portion 154 is flat.

The protruded portion 155 is protruded downward from the lower surface 154*a* of the body portion 154, and has an approximately columnar shape. The protruded portion 155 has a flat pressing face 155*a*. The protruded portion 155 has a bottom end with a peripheral portion arc-shaped in cross section. The protruded portion 155 has a height approximately equal to the thickness of the substrate section 2.

In the primary folding step, the upper face 153 and the holding means G are used to immobilize the metal plate workpiece K1 placed on the primary folding die 151 with the other face Kb of the metal plate workpiece K1 up. Then, the reduced thickness section 41 is pushed downward with the pressing face 155*a* of the protruded portion 155 while the bent portion 34 is being pushed open outward with the lower surface 154*a* of the primary folding punch 152. This brings the base portion 32 and the substrate section 2 into a face-to-face contact. In addition, the upper face of the reduced thickness section 41 is brought to approximately the same height as the upper face of the substrate section 2. In the primary folding step, the folded part 3 extends around the reduced thickness section 41.

<Groove Forming Step>

Figure 12A:
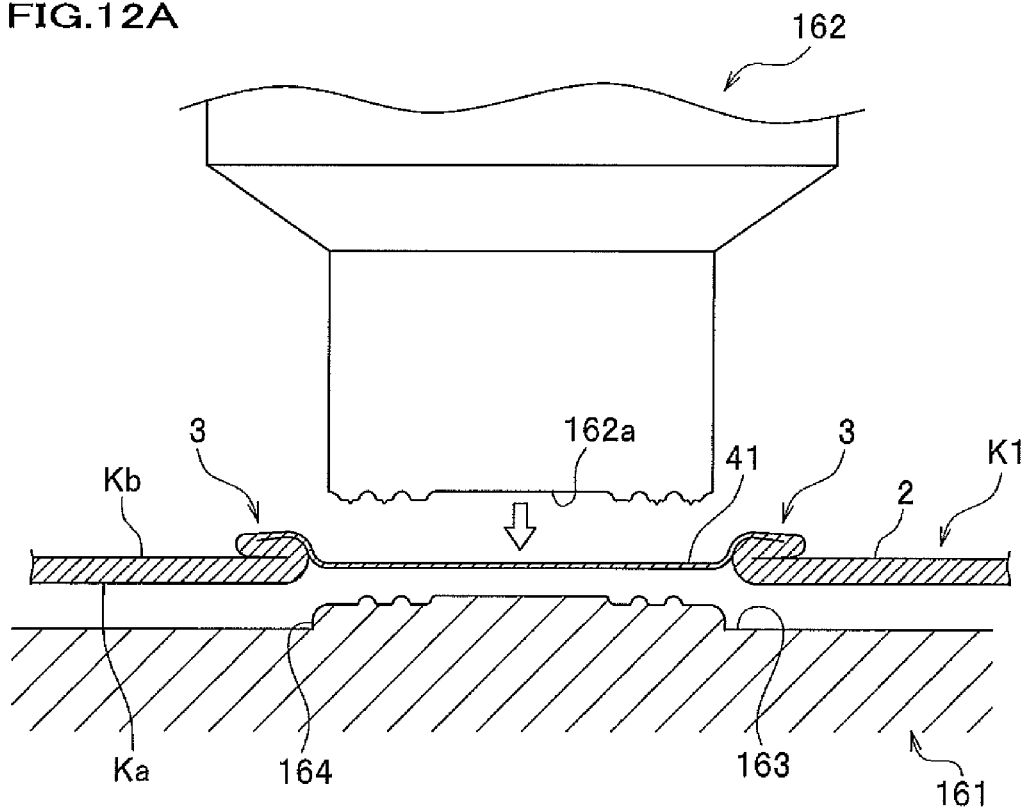
FIGS. 12A and 12B are respectively cross sectional views of the metal plate workpiece before and after a groove forming step according to the present embodiment.
Figure 12B:
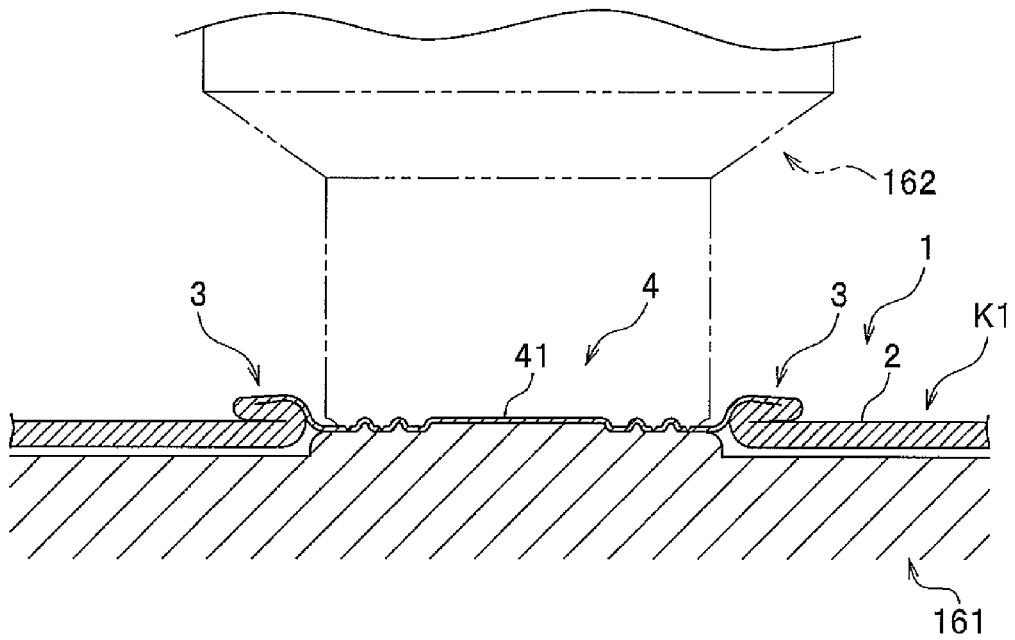

In the groove forming step, as shown in FIGS. 12A and 12B, grooves and the like are formed at the reduced thickness section 41. In the groove forming step, there are used a groove forming die 161 as a lower die and a groove forming punch 162 as an upper die.

The groove forming die 161 is a die having a protruded portion 164 on a flat upper face 163. The protruded portion 164 has an approximately columnar shape. The protruded portion 164 has an upper face formed with projections and recesses for forming the central elevation 42, the first ridge 43, the second ridge 44, the first groove 45, and the second groove 46, as shown in FIGS. 2A and 2B.

The groove forming punch 162 is a die that moves up and down coaxially with the protruded portion 164 of the groove forming die 161. The groove forming punch 162 has a pressing face 162*a* formed with projections and recesses for forming the central elevation 42, the first ridge 43, the second ridge 44, the first groove 45, and the second groove 46, as shown in FIGS. 2A and 2B.

In the groove forming step, the reduced thickness section 41 is placed over the protruded portion 164 with the other face Kb of the metal plate workpiece K1 up. Then, the groove forming punch 162 is pressed against the groove forming die 161 to form the reduced thickness section 4 with the central elevation 42, the first ridge 43, the second ridge 44, the first groove 45, and the second groove 46. Thus, the battery case lid 1 is formed through the above steps.

According to the manufacturing method for the battery case lid 1 described above, since the metal plate K is pushed by the extending punch 102 while being kept unrestrained, a reduction is made in an amount of strains introduced at the formation of the reduced thickness section, and as a result, work hardening of the metal plate workpiece K1 is inhibited. This prevents crack of the reduced thickness section 41 at the formation of the first groove 45 and the second groove 46 in the reduced thickness section 41. Further, the reduced thickness section 41 is formed merely by pushing the extending punch 102 against the metal plate K, which facilitates the operations performed for the formation of the reduced thickness section 41. Moreover, since work hardening of the metal plate workpiece K1 is inhibited, the annealing process may be omitted, reducing the number of operational steps.

Further, in the extending step, while the thickness of the reduced thickness section 41 is gradually being reduced, the metal spread away by the bottom face 104*a* and the extending punch 102*a* is guided to flow through the clearance c between the side face 104*b* of the recess 104 and the extending punch 102 to the outside of the clearance c and further vertically. This enables the cylindrical wall portion 31 to be formed approximately perpendicularly to the reduced thickness section 41. Further, according to the present embodiment, since the internal corner portion 104*c* of the recess 104 and the protrusion 106 of the extending punch 102 each have an arc shape, that metal smoothly flows out.

Further, the clearance c between the side face 104*b* of the recess 104 of the extending die 101 and the extending punch 102 is smaller than the thickness t of the metal plate K. Because the portion of the metal plate workpiece K1 which first starts moving in the extending step is the portion sandwiched between the extending die 101 and the extending punch 102, the above configuration can serve to reduce strains in the portion of the metal plate workpiece K1 which is not sandwiched between the extending die 101 and the extending punch 102, i.e., in the portion forming the cylindrical wall portion 31. The reduction of strains improves the working stability.

Further, since the pressing face 102a of the extending punch 102 is a spherical face which is convex in the pressing direction of the extending punch 102, the metal plate workpiece K1 is pressed to be extended radially from the center of the metal plate workpiece K1, so that the reduced thickness section 41 can have a uniform thickness.

Moreover, since the side face 105a of the extending punch 102 has a top section with the lateral protrusion 106 formed thereon, friction between the side face 105a of the extending punch 102 and the metal plate workpiece K1 at the working can be avoided. This prevents deformation of the metal plate workpiece K1 due to friction resistance relative to the extending punch 102.

Furthermore, since performing the bending step enables reduction in the height of the cylindrical wall portion 31, the height of the battery case lid 1 can be reduced. Further, since performing the folding steps enables formation of the folded part 3, the height of the cylindrical wall portion 31 can be further reduced.

Moreover, since the explosion-proof valve 4 is surrounded by the folded part 3 formed thick by folding the metal plate K, the peripheral area of the explosion-proof valve 4 can be protected. Further, since the folded part 3 can block heat produced by welding or the like, a reduction can be made in an amount of heat entering the explosion-proof valve 4. Further, since the folded part 3 can be formed by merely folding the metal plate workpiece K1, the manufacturing process can be facilitated.

Further, the grooves of the battery case lid 1 (the first groove 45 and the second groove 46) each have a width gradually increasing in the application direction of the internal pressure from inside of the battery case P (in the present embodiment, upwardly). Accordingly, when the internal pressure acts on the explosion-proof valve 4, the grooves tend to be deformed in such a direction as to open across their widths. This ensures the rupture of the grooves. Further, since the ridges (the first ridge 43 and the second ridge 44) are formed in the battery case lid 1, the excess metal produced in the formation of the grooves can be effectively removed to prevent creation of strains.

Figure 13:
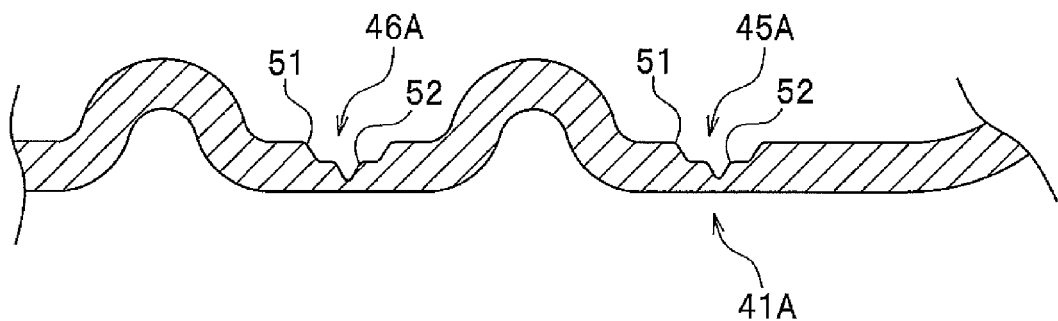
FIG. 13 is an enlarged cross sectional view of a modification of the grooves of the explosion-proof valve.

The embodiment of the present invention has been described. However, design modifications and variations can be made properly to the embodiment of the present invention without departing from the scope of the invention. FIG. 13 is an enlarged cross sectional view showing a modification of the grooves of the explosion-proof valve. As shown in FIG. 13, a reduced thickness section 41A has a first groove 45A and a second groove 46A. Each of the first groove 45A and the second groove 46A includes an enlarged portion 51 having a greater width and a narrowed portion 52 formed in the bottom face of the enlarged portion 51. The groove may have a two-staged depth as described above.

Further, according to the present embodiment, the explosion-proof valve 4 has a circular shape in plan view. However, the shape of the explosion-proof valve 4 is not limited thereto and may be oval or ellipse. In addition, the dimensions in the embodiment are given merely by way of example and not meant to limit the invention.

Further, according to the present embodiment, as shown in FIG. 4, the groove forming step follows the primary folding step. However, there is no limitation thereto, and the groove forming step may follow any one of the extending step, the first correcting step, the second correcting step, the bending step, and the preliminary folding step.

Figure 14:
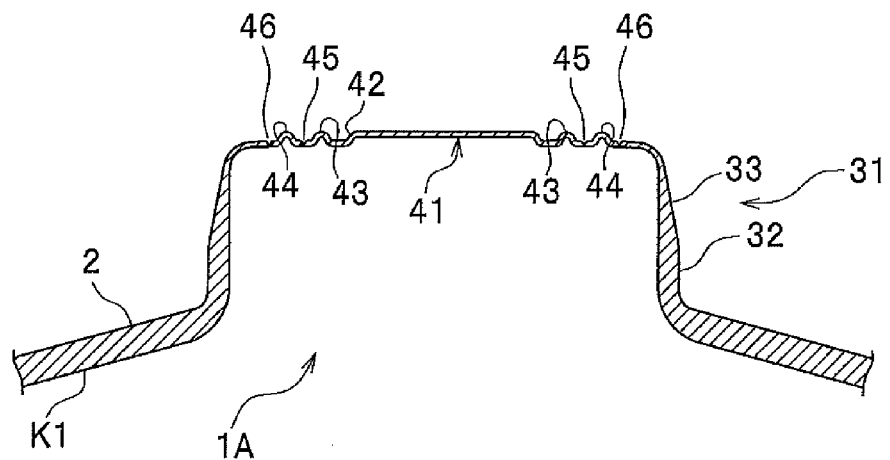
FIG. 14 is a cross sectional view of a first modification of the battery case lid.

FIG. 14 is a cross sectional view of a first modification of the battery case lid. In a battery case lid 1A as the first modification shown in FIG. 14, the extending step is followed by the groove forming step in which the central elevation 42, the first ridge 43, the second ridge 44, the first groove 45, and the second groove 46 are formed in the reduced thickness section 41.

Figure 15:
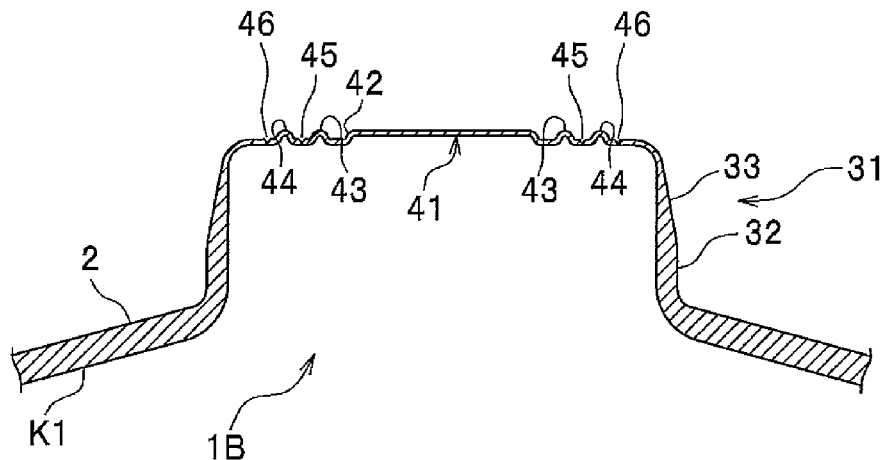
FIG. 15 is a cross sectional view of a second modification of the battery case lid.

FIG. 15 is a cross sectional view of a second modification of the battery case lid. In a battery case lid 1B as the second modification of FIG. 15, the first correcting step is followed by the groove forming step in which the central elevation 42, the first ridge 43, the second ridge 44, the first groove 45, and the second groove 46 are formed in the reduced thickness section 41.

Figure 16:
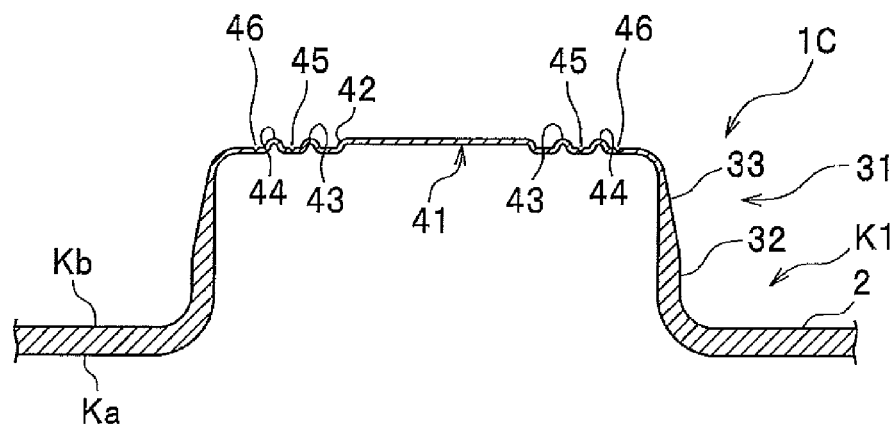
FIG. 16 is a cross sectional view of a third modification of the battery case lid.

FIG. 16 is a cross sectional view of a third modification of the battery case lid. In a battery case lid 1C as the third embodiment of FIG. 16, the second correcting step is followed by the groove forming step in which the central elevation 42, the first ridge 43, the second ridge 44, the first groove 45, and the second groove 46 are formed in the reduced thickness section 41.

Figure 17:
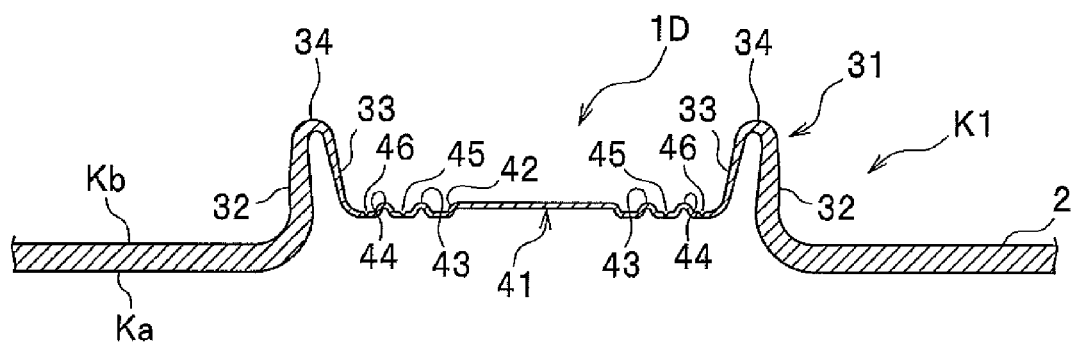
FIG. 17 is a cross sectional view of a fourth modification of the battery case lid.

FIG. 17 is a cross sectional view of a fourth modification of the battery case lid. In a battery case lid 1D as the fourth modification of FIG. 17, the bending step is followed by the groove forming step in which the central elevation 42, the first ridge 43, the second ridge 44, the first groove 45, and the second groove 46 are formed in the reduced thickness section 41.

Figure 18:
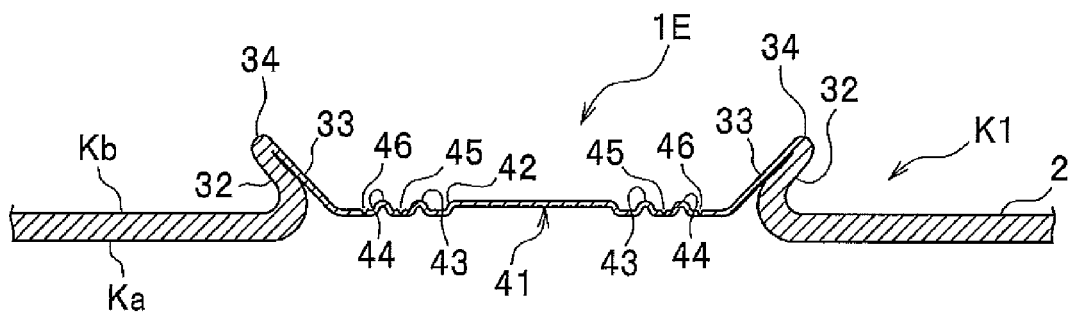
FIG. 18 is a cross sectional view of a fifth modification of the battery case lid.

FIG. 18 is a cross sectional view of a fifth modification of the battery case lid. In a battery case lid 1E as the fifth modification of FIG. 18, the preliminary folding step is followed by the groove forming step in which the central elevation 42, the first ridge 43, the second ridge 44, the first groove 45, and the second groove 46 are formed in the reduced thickness section 41.

According to the first modification 1A to the fourth modification 1D, the cylindrical wall portion 31 is made thicker than the reduced thickness section 41 to protect the reduced thickness section 41. According to the fifth modification 1E, performing the preliminary folding step enables the base portion 32, the tapered portion 33, and the bent portion 34 to lie on one another, creating a portion thicker than the reduced thickness section 41 to protect the reduced thickness section 41.

Further, according to the present embodiment, the extending step is performed to form the reduced thickness section 41. However, there is no limitation thereto, and the extending step may be replaced with, for example, press-working or deep drawing, spinning. Or, other working that enables the metal plate to take the shape of a cylinder with a bottom may be performed. Further, these workings may be followed by the formation of the reduced thickness section, which is then subjected to in the groove forming step to have a recess or groove formed in the reduced thickness section, thereby forming the battery case lid.

Further, according to the present embodiment, as shown in FIGS. 2A and 2B, the folded part 3 is formed on the outer side of the battery case lid (on the face opposite to the face to which the internal pressure is applied) thereof, but may be formed on the inner side instead.

DESCRIPTION OF REFERENCE CHARACTERS 1 battery case lid
2 substrate section 3 folded part
4 explosion-proof valve
31 cylindrical wall portion
32 base portion
33 tapered portion
34 bent portion
41 reduced thickness section
42 central elevation
43 first ridge
44 second ridge
45 first groove (groove)
46 second groove (groove)
101 extending die
102 extending punch
104 recess
104a bottom face
104b side face
131 bending die
132 bending punch
141 preliminary folding die
142 preliminary folding punch
151 primary folding die
152 primary folding punch
161 groove forming die
162 groove forming punch
K metal plate
K1 metal plate workpiece
Ka one face
Kb the other face
c clearance
e depth of recess
t thickness of metal plate

The invention claimed is:

1. A manufacturing method for a battery case lid including an explosion-proof valve, the manufacturing method comprising:
an extending step of pushing an extending punch from a first side of a metal plate disposed over an extending die having a recess, to form a reduced thickness section constituting the explosion-proof valve,
wherein the recess has an inner diameter greater than an outer diameter of the extending punch,
wherein a clearance between a side face of the recess of the extending die and an outer periphery at a top section on a side face of the extending punch is set to be smaller than a thickness of the metal plate, the top section being formed by an end of the extending punch facing the recess,
wherein in the extending step, the extending punch is pushed while the metal plate is kept unrestrained, and the metal plate is pressed to be extended between a bottom face of the recess and a pressing face of the extending punch, to form the reduced thickness section and a cylindrical wall portion at least until the thickness of the metal plate is smaller than the clearance between the side face of the recess of the extending die and the outer periphery at the top section on the side face of the extending punch, and
wherein the extending step is followed by a bending step in which the reduced thickness section is pressed by a bending punch smaller in outer diameter than the reduced thickness section from a second side of the metal plate, to bend a cylindrical wall portion formed around the reduced thickness section.

2. The manufacturing method for the battery case lid of claim 1, wherein the bending step is followed by a folding step in which a bent portion formed by bending the cylindrical wall portion in the bending step is pushed by a folding punch from the second side of the metal plate, to fold the bent portion.

3. The manufacturing method for the battery case lid of claim 1, further comprising a groove forming step of forming a groove in the reduced thickness section, and wherein in the groove forming step, the reduced thickness section is pressed by a groove-forming punch from a second side of the metal plate to form the reduced thickness section with a groove.

4. The manufacturing method for the battery case lid of claim 2, further comprising a groove forming step of forming a groove in the reduced thickness section, and wherein in the groove forming step, the reduced thickness section is pressed by a groove-forming punch from a second side of the metal plate to form the reduced thickness section with a groove.

* * * * *